(12) United States Patent
Gupta

(10) Patent No.: US 7,280,252 B1
(45) Date of Patent: Oct. 9, 2007

(54) ERROR DIFFUSION OF MULTIRESOLUTIONAL REPRESENTATIONS

(75) Inventor: Maya Rani Gupta, Palo Alto, CA (US)

(73) Assignee: Ricoh Co., Ltd., Tokyo (JP)

( * ) Notice: Subject to any disclaimer, the term of this patent is extended or adjusted under 35 U.S.C. 154(b) by 1052 days.

(21) Appl. No.: 10/028,468

(22) Filed: Dec. 19, 2001

(51) Int. Cl.
*H04N 1/405* (2006.01)

(52) U.S. Cl. .................................. 358/3.04; 358/3.05

(58) Field of Classification Search ...... 358/3.03–3.06, 358/1.9, 2.1; 382/251–252, 237, 240
See application file for complete search history.

(56) References Cited

U.S. PATENT DOCUMENTS

| | | | |
|---|---|---|---|
| 3,580,655 | A | 5/1971 | Leith et al. |
| 3,950,103 | A | 4/1976 | Schmidt-Weinmar |
| 4,136,954 | A | 1/1979 | Jamieson |
| 4,155,097 | A | 5/1979 | Lux |
| 4,190,861 | A | 2/1980 | Lux |
| 4,223,354 | A | 9/1980 | Noble et al. |
| 4,393,456 | A | 7/1983 | Marshall, Jr. |
| 4,437,087 | A | 3/1984 | Petr |
| 4,569,075 | A | 2/1986 | Nussbaumer |
| 4,599,567 | A | 7/1986 | Goupillaud et al. |
| 4,652,881 | A | 3/1987 | Lewis |
| 4,663,660 | A | 5/1987 | Fedele et al. |
| 4,674,125 | A | 6/1987 | Carlson et al. |
| 4,701,006 | A | 10/1987 | Perlmutter |
| 4,751,742 | A | 6/1988 | Meeker |
| 4,760,563 | A | 7/1988 | Beylkin |
| 4,785,348 | A | 11/1988 | Fonsalas et al. |
| 4,785,349 | A | 11/1988 | Keith et al. |
| 4,799,179 | A | 1/1989 | Masson et al. |
| 4,805,129 | A | 2/1989 | David |
| 4,815,023 | A | 3/1989 | Arbeiter |
| 4,817,182 | A | 3/1989 | Adelson et al. |
| 4,821,223 | A | 4/1989 | David |
| 4,827,336 | A | 5/1989 | Acampora et al. |
| 4,829,378 | A | 5/1989 | Le Gall |
| 4,837,517 | A | 6/1989 | Barber |

(Continued)

FOREIGN PATENT DOCUMENTS

EP     0510933 A1     10/1992

(Continued)

OTHER PUBLICATIONS

Antonini, et al., "Image Coding Using Wavelet Transform", *IEEE Transactions on Image Processing*, vol. 1, No. 2, Apr. 1992, pp. 205-220.

(Continued)

*Primary Examiner*—Thomas D. Lee
*Assistant Examiner*—Stephen Brinich
(74) *Attorney, Agent, or Firm*—Blakely, Sokoloff, Taylor & Zafman LLP

(57) ABSTRACT

A method and apparatus for performing error diffusion of a multiresolutional representation of an image is disclosed herein. In one embodiment, an image is received as a pixel representation. The image is converted from a pixel representation to a multiresolutional representation having multiresolutional coefficients. Each multiresolutional coefficient is quantized and an error is passed to one or more other multiresolutional coefficients as specified by an error filter. Finally, the resulting quantized image is produced as output.

39 Claims, 12 Drawing Sheets

U.S. PATENT DOCUMENTS

| | | |
|---|---|---|
| 4,839,889 A | 6/1989 | Gockler |
| 4,858,017 A | 8/1989 | Torbey |
| 4,864,398 A | 9/1989 | Avis et al. |
| 4,868,868 A | 9/1989 | Yazu et al. |
| 4,881,075 A | 11/1989 | Weng |
| 4,894,713 A | 1/1990 | Delogne et al. |
| 4,897,717 A | 1/1990 | Hamilton et al. |
| 4,899,147 A | 2/1990 | Schiavo et al. |
| 4,904,073 A | 2/1990 | Lawton et al. |
| 4,918,524 A | 4/1990 | Ansari et al. |
| 4,922,544 A | 5/1990 | Stansfield et al. |
| 4,929,223 A | 5/1990 | Walsh |
| 4,929,946 A | 5/1990 | O'Brien et al. |
| 4,936,665 A | 6/1990 | Whitney |
| 4,973,961 A | 11/1990 | Chamzas et al. |
| 4,974,187 A | 11/1990 | Lawton |
| 4,982,283 A | 1/1991 | Acampora |
| 4,985,927 A | 1/1991 | Norwood et al. |
| 4,987,480 A | 1/1991 | Lippman et al. |
| 4,999,705 A | 3/1991 | Puri |
| 5,000,183 A | 3/1991 | Bonnefous |
| 5,001,764 A | 3/1991 | Wood et al. |
| 5,014,134 A | 5/1991 | Lawton et al. |
| 5,018,210 A | 5/1991 | Merryman et al. |
| 5,049,992 A | 9/1991 | Citta et al. |
| 5,049,993 A | 9/1991 | LeGall et al. |
| 5,068,911 A | 11/1991 | Resnikoff et al. |
| 5,072,308 A | 12/1991 | Lin et al. |
| 5,073,964 A | 12/1991 | Resnikoff |
| 5,081,645 A | 1/1992 | Resnikoff et al. |
| 5,095,447 A | 3/1992 | Manns et al. |
| 5,097,261 A | 3/1992 | Langdon, Jr. et al. |
| 5,097,331 A | 3/1992 | Chen et al. |
| 5,101,280 A | 3/1992 | Moronaga et al. |
| 5,101,446 A | 3/1992 | Resnikoff et al. |
| 5,103,306 A | 4/1992 | Weiman et al. |
| 5,109,451 A | 4/1992 | Aono et al. |
| 5,121,191 A | 6/1992 | Cassereau et al. |
| 5,124,930 A | 6/1992 | Nicolas et al. |
| 5,128,757 A | 7/1992 | Citta et al. |
| 5,128,791 A | 7/1992 | Le Gall et al. |
| 5,148,498 A | 9/1992 | Resnikoff et al. |
| 5,152,953 A | 10/1992 | Ackermann |
| 5,156,943 A | 10/1992 | Whitney |
| 5,173,880 A | 12/1992 | Duren et al. |
| 5,182,645 A | 1/1993 | Breeuwer et al. |
| 5,223,926 A | 6/1993 | Stone et al. |
| 5,235,434 A | 8/1993 | Wober |
| 5,241,395 A | 8/1993 | Chen |
| 5,262,958 A | 11/1993 | Chui et al. |
| 5,276,525 A | 1/1994 | Gharavi |
| 5,315,670 A | 5/1994 | Shapiro |
| 5,321,776 A | 6/1994 | Shapiro |
| 5,335,016 A | 8/1994 | Nakagawa |
| 5,347,479 A | 9/1994 | Miyazaki |
| 5,349,348 A | 9/1994 | Anderson et al. |
| 5,379,355 A | 1/1995 | Allen |
| 5,381,145 A | 1/1995 | Allen et al. |
| 5,384,869 A | 1/1995 | Wilkinson et al. |
| 5,412,741 A | 5/1995 | Shapiro |
| 5,414,780 A | 5/1995 | Carnahan |
| 5,416,604 A | 5/1995 | Park |
| 5,420,891 A | 5/1995 | Akansu |
| 5,442,458 A | 8/1995 | Rabbani et al. |
| 5,453,945 A | 9/1995 | Tucker et al. |
| 5,455,874 A | 10/1995 | Ormsby et al. |
| 5,481,308 A | 1/1996 | Hartung et al. |
| 5,495,292 A | 2/1996 | Zhang et al. |
| 5,497,435 A | 3/1996 | Berger |
| 5,511,151 A | 4/1996 | Russell et al. |
| 5,534,925 A | 7/1996 | Zhong |
| 5,537,493 A | 7/1996 | Wilkinson |
| 5,541,594 A | 7/1996 | Huang et al. |
| 5,546,477 A | 8/1996 | Knowles et al. |
| 5,563,960 A | 10/1996 | Shapiro |
| 5,566,089 A | 10/1996 | Hoogenboom |
| 5,602,589 A | 2/1997 | Vishwanath et al. |
| 5,631,977 A | 5/1997 | Koshi et al. |
| 5,638,498 A | 6/1997 | Tyler et al. |
| 5,657,085 A | 8/1997 | Katto |
| 5,701,367 A | 12/1997 | Koshi et al. |
| 5,717,789 A | 2/1998 | Anderson et al. |
| 5,754,793 A | 5/1998 | Eom et al. |
| 5,808,683 A | 9/1998 | Tong et al. |
| 5,809,176 A | 9/1998 | Yajima |
| 5,850,482 A | 12/1998 | Meany et al. |
| 5,867,602 A | 2/1999 | Zandi et al. |
| 5,880,856 A | 3/1999 | Ferriere |
| 5,966,465 A | 10/1999 | Keith et al. |
| 5,974,183 A * | 10/1999 | Wilkinson ................. 382/236 |
| 6,020,975 A | 2/2000 | Chen et al. |
| 6,026,198 A | 2/2000 | Okada |
| 6,088,062 A | 7/2000 | Kanou et al. |
| 6,101,279 A | 8/2000 | Nguyen et al. |
| 6,118,902 A | 9/2000 | Knowles |
| 6,121,970 A | 9/2000 | Guedalia |
| 6,128,413 A | 10/2000 | Benamara |
| 6,160,846 A | 12/2000 | Chiang et al. |
| 6,201,897 B1 | 3/2001 | Nixon |
| 6,229,929 B1 | 5/2001 | Lynch et al. |
| 6,236,765 B1 | 5/2001 | Acharya |
| 6,237,010 B1 | 5/2001 | Hui et al. |
| 6,263,109 B1 | 7/2001 | Ordentlich et al. |
| 6,263,120 B1 | 7/2001 | Matsuoka |
| 6,327,392 B1 | 12/2001 | Li |
| 6,330,666 B1 | 12/2001 | Wise et al. |
| 6,339,658 B1 | 1/2002 | Moccagatta et al. |
| 6,350,989 B1 | 2/2002 | Lee et al. |
| 6,356,668 B1 | 3/2002 | Honsinger et al. |
| 6,466,698 B1 | 10/2002 | Creusere |
| 6,483,946 B1 | 11/2002 | Martucci et al. |
| 6,546,143 B1 | 4/2003 | Taubman et al. |
| 6,625,321 B1 | 9/2003 | Li et al. |
| 6,650,782 B1 | 11/2003 | Joshi et al. |
| 6,668,090 B1 | 12/2003 | Joshi et al. |
| 2001/0021223 A1 | 9/2001 | Andrew |
| 2001/0047517 A1 | 11/2001 | Christopoulos et al. |
| 2003/0110299 A1 | 6/2003 | Larsson et al. |

FOREIGN PATENT DOCUMENTS

| | | |
|---|---|---|
| EP | 0593013 A2 | 4/1994 |
| EP | 0611051 A1 | 8/1994 |
| EP | 0622741 A2 | 11/1994 |
| EP | 701375 A2 | 3/1996 |
| EP | 0967556 A2 | 12/1999 |
| EP | 1035511 A2 | 9/2000 |
| EP | 1164781 A1 | 12/2001 |
| GB | 2 211 691 A | 7/1989 |
| GB | 2 284 121 A | 5/1995 |
| GB | 2 285 374 A | 7/1995 |
| GB | 2 293 733 A | 4/1996 |
| GB | 2 293 734 A | 4/1996 |
| GB | 2 303 030 A | 2/1997 |
| GB | 2 303 031 A | 2/1997 |
| GB | 2 341 035 A | 3/2000 |
| JP | 406038193 A | 7/1992 |
| JP | 06-245077 | 9/1994 |
| JP | 6-350989 | 12/1994 |
| JP | 7-79350 | 3/1995 |
| WO | WO88/10049 | 12/1988 |
| WO | WO91/03902 | 3/1991 |
| WO | WO91/18361 | 11/1991 |
| WO | WO93/10634 | 5/1993 |

| WO | WO94/17492 | 8/1994 |
| WO | WO94/23385 | 10/1994 |
| WO | WO95/19683 | 7/1995 |
| WO | WO96/09718 | 3/1996 |
| WO | WO 00/49571 | 8/2000 |
| WO | WO 01/16764 A1 | 3/2001 |

OTHER PUBLICATIONS

Blumberg, et al., "Visual Realism and Interativity for the Internet", IEEE, 1997, pp. 269-273.
Boliek, et al., "Decoding compression with reversible embedded wavelets (CREW) codestreams", Journal of Electronic Imaging, Jul. 1998, vol. 7 (3), pp. 402-409.
Boliek, et al., "JPEG 2000 for Efficient Imaging in a Client/Server Environment", Proceeding of the PIE, SPIE, Bellingham, VA, US, vol. 4472, Jul. 31, 2001, pp. 212-223, XP008010308.
Boliek, et al., "JPEG 2000 Next Generation Image Compression System", IEEE 0-7803-6297, 45-48.
Calderbank, et al., "Wavelet Transforms That Map Integers to Integers", Aug. 1996.
Carey, et al: "Regularity-Preserving Image Interpolation", IEEE Transactions on Image Processing, vol. 8., No. 9, Sep. 1999, pp. 1293-1297, XP002246254.
Carrato, et al: "A Simple Edge-Sensitive Image Interpolation Filter", Proceedings of the International Confrence on Image Processing (ICIP), Lausanne, Sep. 16-19, 1996, New York, IEEE, US, vol. 1, pp. 711-714, XP010202493.
Chen, et al., "Wavelet Pyramid Image Coding with Predictable and Controllable Subjective Picture Quality", *IEICE Trans. Fundamentals*, vol. E76-A., No. 9, Sep. 1993, pp. 1458-1468.
Cheong, et al., "Subband Image Coding with Biorthogonal Wavelets", *IEICE Trans. Fundamentals*, vol. E75-A., No. 7, Jul. 1992, pp. 871-881.
Chrysafis, et al., "An Algorith for Low Memory Wavelet Image Compression", IEEE 0-7803-5467-2/99, pp. 354-358.
Chrysafis, et al., "Line Based Reduced Memory, Wavelet Image Compression," Data Compression Conference, 1998, DCC '98, Proceedings Snowbird, UT, Mar. 1998, pp. 398-407.
Chui, et al., "Wavelets on a Bounded Interval", *Numerical Methods of Approximation Theory*, vol. 9, 1992, pp. 53-75.
Crochiere, et al., "Digital Coding of Speech in Sub-bands", 1976, American Telephone and Telegraph Company, The Bell System Technical Journal, vol. 55, No. 8, Oct. 1976, p. 1069-1085.
Denk, et al., "Architectures for Latttice Structure Based Orthonormal Discrete Wavelet Transforms", *IEEE*, 1994, pp. 259-270.
Deshpande, et al., "HTTP Streaming of JPEG2000 Images", IEEE, 2001, pp. 15-19.
Dutch Search Report, 133082, Nov. 26, 1996.
Esteban, et al., "1977 IEEE International Conference on Acoustics, Speech & Signal Processing", "Application of Quadrature Mirror Filters to Split Band Voice Coding Schemes", p. 191-195.
French Search Report, FR9511023, Nov. 26, 1996.
French Search Report, FR9511024, Nov. 26, 1996.
German Search Report, Dated Mar. 21, 1997, 3 pages.
Gharavi, et al., "Proceedings: ICASSP 87", 1987 International Conference on Acoustics, Speech, and Signal Processing, Apr. 6, 7, 8, 9, 1987, vol. 4 of 4, "Application of Quadrature Mirror Filtering to the Coding of Monochrome and Color Images", p. 2384-2387.
Gharavi, et al., "Sub-band Coding of Digital Images Using Two-Dimensional Quadrature Mirror Filtering:, SPIE vol. 707 Visual Communications and Image Processing", 1986, p. 51-61.
Gordon, Benjamin M., et al., "A 1.2 mW Video-Rate 2-D Color Subband Decoder," IEEE Journal of Solid-State Circuits, IEEE Inc. New York, vol. 30, No. 12, Dec. 1, 1995, pp. 1510-1516.
Hauf, et al., "The FlashPix™ Image File Format", The Fourth Color Imaging Conference: Color Science, Systems and Application, 1996, pp. 234-238.
Howard, et al., "Fast and Efficient Lossless Image Compression", *IEEE*, 1993, pp. 351-360.

Information Technology—JPEG 2000 Image Coding System—Part 1: Core Coding System, ISO/IEC 15444-1, Dec. 15, 2000, p. 5, 14, 22.
International Search Report for Application No. GB 9518298.6, dated Nov. 8, 1995.
JPEG 2000 Part 1 Final Committee Draft Version 1.0, Image Compression Standard described in ISO/IEC 1/SC 29/WG 1 N1646, Mar. 16, 2000.
Komatsu, et al., "Reversible Subband Coding of Images", SPIE vol. 2501, pp. 676-648.
Langdon, Jr., "Sunset: A Hardware-Oriented Algorithm for Lossless Compression of Gray Scale Images", *SPIE vol. 1444, Image Capture, Formatting, and Display*, 1991, pp. 272-282.
Le Gall, et al., "Sub-band coding of Digital Images Using Symmetric Short Kernal Filters and Arithmetic Coding Techniques", 1988, International Conference on Acoustics, Speech and Signal Processing, pp. 761-764.
Lewis, et al., "Image Compression Using the 2-D Wavelet Transform", *IEEE Transactions on Image Processing*, vol. 1, No. 2, Apr. 1992, pp. 244-250.
Lux, P., "A Novel Set of Closed Orthogonal Functions for Picture Coding", 1977, pp. 267-274.
Marcellin, et al., "An Overview of JPEG-2000", Proceedings. DCC 2000 Snowbird, UT, USA, Mar. 28-30, 2000, pp. 523-541, XP010377392.
Meng, Teresa H., "A Wirless Portable Video-on-Demand System," VLSI Design, 1998, Proceedings Eleventh International Conference on Chennai, India 407, Jan. 1998, California, pp. 4-9.
Ohta, et al., "Wavelet Picture Coding with Transform Coding Approch", Jul. 1992, No. 7, pp. 776-784.
Padmanabhan, et al., "Feedback-Based Orthogonal Digital Filters", *IEEE Transactions on Circuits and Systems*, Aug. 1993, No. 8, pp. 512-525.
Pollara et al., "Rate-distortion Efficiency of Subband Coding with Integer Coefficient Filters", Jul. 1994, pp. 419, Information Theory, 1994, IEEE.
Reeves, et al: "Multiscale-Based Image Enhancement", Electrical and Computer Engineering, 1997. Engineering Innovation: Voyage of Discovery. IEEE 1997 Canadian Conference on St. Johns, NFLD., Canada May 25-28, 1997, New York, NY. (pp. 500-503), XP010235053.
Reusens, "New Results in Subband/Wavelet Image Coding", May 1993, p. 381-385.
Said, et al., "Image Compression Using the Spatial-Orientation Tree", *IEEE*, 1993, pp. 279-282.
Said, et al., "Reversible Image Compression Via Multiresolution representation and Predictive Coding", Aug. 11, 1993, pp. 664-674.
Shah, et al., "A Chip Set for Lossless Image Compression", *IEEE Journal of Solid-State Circuits*, vol. 26, No. 3, Mar. 1991, pp. 237-244.
Shapiro, J. M., "An Embedded Hierarchical Image Coder Using Zerotrees of Wavelet Coeffiecients", *IEEE*, 1993, pp. 214-223.
Shapiro, J. M., "Embedded Image Coding Using Zerotrees of Wavelet Coefficients", *IEEE Transactions on Signal Processing*, Dec. 1993, No. 12, pp. 3445-3462.
Smith, et al., "Exact Reconstruction Techniques for Tree-Structured Subband Coders", IEEE Transactions on Acoustics, Speech, and Signal Processing, vol. ASSP-34, No. 3 Jun. 1986, p. 434-441.
Stoffel, et al: "A Survey Of Electronic Techniques For Pictorial Image Reproduction," IEEE Transactions On Communications, vol. COM-29, No. 12, Dec. 1981, pp. 1898-1925, XP000560531 IEEE, New York (US).
Szu, et al., "Image Wavelet Transforms Implemented by Discrete Wavelet Chips", *Optical Engineering*, Jul. 1994, vol. 33, No. 7, pp. 2310-2325.
Vetterli, Martin, "Filter Banks Allowing Perfect Reconstruction", Signal Processing 10 (1986), p. 219-244.
Vetterli, Martin, "Multi-Dimensional Sub-band Coding: Some Theory and Algorithms", Signal Processing 6 (1984) p. 97-112.
Villasenor, et al., "Filter Evaluation and Selection in Wavelet Image Compression", *IEEE*, 1994, pp. 351-360.
Westernick, et al., "Proceedings: ICASSP 87", 1987 International Conference on Acoustics, Speech, and Signal Processing, Apr. 6, 7, 8, 9, 1987, vol. 3 of 4, "Sub-band coding of images Using Predictive Vector Quantization", p. 1378-1381.

Woods, "Subband Image Coding", 1991, pp. 101-108, 163-167, and 180-189.

Woods, et al., "Subband Coding of Images", *IEEE Transactions on Acoustics, Speech, and Signal Processing*, vol. 1 ASSP-34, No. 5, Oct. 1986, pp. 1278-1288.

Woods, et al., "Sub-band coding of Images", Proceedings ICASSP 86, Tokyo, Japan, Apr. 1986, p. 1005-1008.

Wu, et al., "New Compression Paradigms in JPEG2000", Applications of Digital Image Processing XXIII, San Diego, CA USA, Jul. 31-Aug. 3, 2000, vol. 4115, pp. 418-429, XP008013391, Proceedings of the DPIE—The International Society for Optical Engineering, 2000, SPIE-Int. Soc. Opt. Eng., USA.

Xiong, et al., "Joint Optimization of Scalar and Tree-structured Quantization of Wavelet Image Decompositions", Jan. 11, 1993, pp. 891-895.

J.C. Stoffel, et al., "A Survey of Electronic Techniques for Pictorial Image Reproduction," IEEE Transactions on Communications, vol. COM-29, No. 12, Dec. 1981, XP000560531 IEEE, New York (US).

\* cited by examiner

FIG. 9A

| 2LL | 1HL | 2LL | 1HL |
|-----|-----|-----|-----|
| 1LH | 1HH | 1LH | 1HH |
| 2LL | 1HL | 2LL | 1HL |

FIG. 9B

| 3LL | 1HL | 2HL | 1HL | 3LL | 1HL |
|-----|-----|-----|-----|-----|-----|
| 1LH | 1HH | 1LH | 1HH | 1LH | 1HH |
| 2LH | 1HL | 2HH | 1HL | 2LH | 1HL |
| 1LH | 1HH | 1LH | 1HH | 1LH | 1HH |
| 3LL | 1HL | 2HL | 1HL | 3LL | 1HL |

ERROR DIFFUSION OF MULTIRESOLUTIONAL REPRESENTATIONS

FIELD OF THE INVENTION

This invention relates generally to the field of image processing, and more specifically to perform error diffusion on multiresolutional representations of images.

BACKGROUND OF THE INVENTION

Error diffusion is an idea generally credited to Floyd and Steinberg (See "An adaptive algorithm for spatial greyscale," R. W. Floyd and L. Steinberg, Proceedings of the Society for Information Display, vol. 17, no. 2, pp. 75-77, 1976) and dates back to 1976, though it is equivalently a two-dimensional implementation of sigma-delta modulation, which as a tool for one-dimensional A/D converters dates at least to 1963 (see "A unity bit coding method by negative feedback," H. Inose and Y. Yasuda, Proceedings of the IEEE, vol. 51, pp. 1524-1535, November 1963). As described therein, the basic error diffusion process is to raster scan the pixels, and for each pixel quantize it to black or white, then pass the error to neighboring pixels. However, the process is done serially, and for each pixel, the error between the original pixel and the quantized version is calculated and spatially filtered to pixels that have yet to be quantized. Thus pixels that are quantized are not the original pixels from the image, but the original pixels plus the error they have inherited from pixels previously quantized. FIG. 8 is a flow diagram showing a visual representation of the error diffusion process. Note that error diffusion is also equivalent to DPCM Differential Pulse Coded Modulation.

Error diffusion performs fairly well and is used often in practice. It is particularly good at accentuating edges in an image. Possibly the worst side effect is the graininess of a resulting image. In most applications, error diffusion quantizes between white and black, but error diffusion allows for a more general quantization. For instance, vector error diffusion of color images quantizes each incoming pixel to the closest of a small number of colors in a preset palette, where each color is defined by a three-dimensional vector.

Researchers have manipulated many factors in error diffusion, including the filter taps, the raster scan order, spatially-varying filters, adaptive filters approaches mixed with clustered dot dither, dot gain compensation, etc.

Halftoning takes a continuous image with many colors and creates an image that looks like the original but uses only two or a few colors. Halftoning is often implemented using the error diffusion algorithm, which is performed sequentially on pixels. To date, error diffusion is an algorithm performed on pixels, in the pixel domain.

Two papers, "Adaptive Error Diffusion for Multiresolution Rendering," P. W. Wong. Society for Information Display Digest, 1994, and "Embedded Multilevel Error Diffusion," J. R. Goldschneider, E. Riskin, P. W. Wong. IEEE Transactions on Image Processing, vol. 6, no. 7, July 1997, investigate the problem of designing an error diffused image that can be well rendered at many different resolutions. However, all of the operations therein are done in the pixel domain.

Other sources, including "Wavelet methods for compression, rendering, and descreening in digital halftoning," N. A. Breaux and C. H. Chu. SPIE Conference Proceedings, vol. 3078, 1997, and "Multiresolution error-convergence halftone algorithm," E. Peli. Journal of the Optical Society of America A, vol. 8, no. 4, April 1991, attempt to match the energy of each level in the halftone to the energy in that level of the multiresolutional original image. The goal of these sources is apparently to yield a halftone that is designed for progressive display at increasing resolution. These halftoning techniques do not use error diffusion.

One conference paper, "A Recursive Multiscale Error-Diffusion Technique for Digital Halftoning," I. Katsavoundidis and C. C. Kuo, SPIE Conference Proceedings vol. 2094, 1993, also proposes the goal of multi-level mean-matching. This paper describes pixels being quantized, but in a random scan order. Error is diffused symmetrically about a quantized pixel, as opposed to the normal forward-only error propagation approach. However, because some neighboring pixels may already be quantized, the error that would have been passed to them is summed into a "global error" for that local region. These "global errors" are passed to neighboring regions using the same spatial error filter. The paper proposes the idea of passing some error from different regions within a scale. Again, however, it is the pixels themselves which are quantized.

The same authors refined their ideas and presented a modified algorithm in "A multiscale error diffusion technique for digital halftoning," I. Katsavoundidis and C. C. Kuo, IEEE Transactions on Image Processing, vol. 6, no. 3, March 1997. That algorithm employs a nonlinear but non-random scanning order of the pixels, but still quantizes the pixels themselves, and still uses a non-causal filter (which is made possible due to the nonlinear scan order). The multiresolutional framework only affects the scan order of the pixels.

In "Neural Network Adaptive Digital Image Screen Halftoning (DISH) based on Wavelet Transform Preprocessing," H. Szu, Y. Zhang, M. Sun, and C. C. Li, SPIE Conference Proceedings, vol. 2242, 1994, an adaptive screen for dithering was proposed in which the information about how to adapt the screen is pulled from the wavelet transform representation.

Speed of copying, printing, and processing are especially important to business customers. More image processing is moving to wavelet, or multiresolutional domains. Yet the image has traditionally had to be converted back to the pixel domain to do the error diffusion. Speed could be increased if this conversion could be avoided.

SUMMARY OF THE INVENTION

A method and apparatus for performing error diffusion of a multiresolutional representation of an image is disclosed herein. In one embodiment, an image is received as a pixel representation. The image is converted from a pixel representation to a multiresolutional representation having multiresolutional coefficients. Each multiresolutional coefficient is quantized and an error is passed to other multiresolutional coefficients as specified by an error filter. Finally, a resulting quantized image is produced as an output.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 9A illustrates an arrangement of first-level Haar coefficients for a one-level Haar wavelet transform;

FIG. 9B illustrates an arrangement of two-level Haar coefficients for a two-level Haar wavelet transform

DETAILED DESCRIPTION

Figure 1:
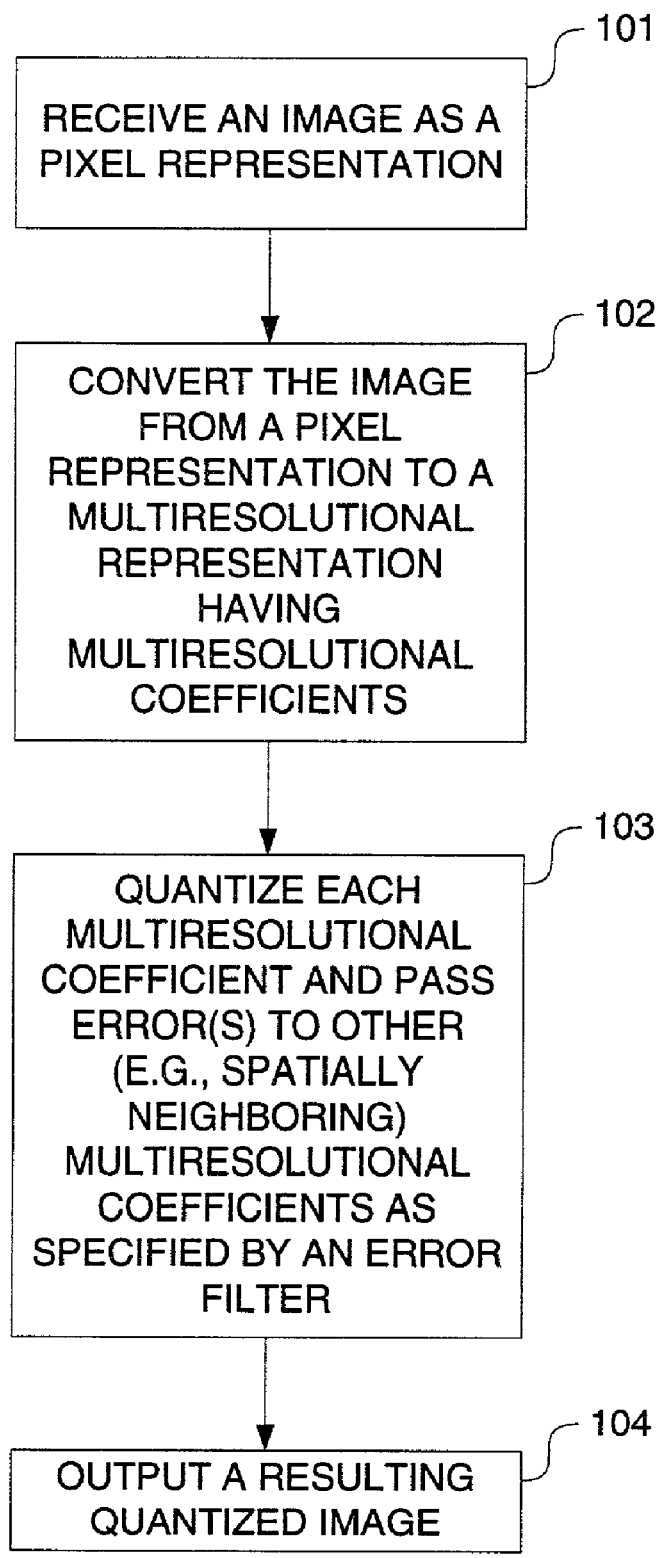
FIG. 1 is a flow diagram of one embodiment of a process for performing error diffusion of a multiresolutional representation of an image.

The present invention performs error diffusion on multiresolutional representations of images. In one embodiment, the error diffusion is performed in the wavelet domain. In this case, during the error diffusion process, wavelet coefficients in the multiresolutional representation are quantized and one or more error values representing, at least in part, a difference between the quantized coefficients and non-quantized coefficients, are passed onto one or more other (e.g., spatially neighboring) coefficients.

By removing the need to invert the wavelet transform before halftoning, increased copying and printing speed can be achieved. Parallel error diffusion allows for a huge increase in speed, and parallel error diffusion may be a more realistic technique if done on wavelet coefficients due to the non-causality of error diffusion on the wavelet domain which crosses the artificial borders created by parallel error diffusion. Apart from increases in processing speed, it may be possible to design new wavelet domain error propagation spatial filters that achieve sharp edges and fewer "wormies" (artifacts) than is now possible. Wormies are an artifact where halftone dots bunch together in long squiggly lines, and they are a common problem in error diffusion halftones.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a flow diagram showing a method for error diffusion of a multiresolutional representation of an image. The process is performed by processing logic that may comprise hardware (e.g., circuitry, dedicated logic, etc.), software (such as is run, for example, on a general purpose computer system of a dedicated machine), or a combination of both.

Referring to FIG. 1, in processing block 101, processing logic receives an image as a pixel representation. In processing block 102, processing logic converts the image from a pixel representation to a multiresolutional representation having multiresolutional coefficients. The multiresolutional representation may be, in varying embodiments, a pyramidal decomposition, a wavelet decomposition, a time-frequency decomposition, or another multiresolutional representation of an image. In one embodiment, the decompositions may be two-dimensional (2-D). In an alternative embodiment, the decompositions may be three-dimensional (3-D).

Multiresolutional coefficients may include scaling coefficients and wavelet (difference) coefficients. These may be referred to herein as transform coefficients. In processing block 103, processing logic quantizes each multiresolutional coefficient and passes one or more error values to spatially close multiresolutional coefficients as specified by an error filter. In other words, processing logic adds that one or more error values to spatially neighboring coefficients. In this manner, error diffusion is performed on the multiresolutional coefficients.

In essence, wavelet domain coefficients contain information about local averages and differences, or "errors to the average." Diffusing the error spreads out the local averages. The difference coefficients cause the image's edge information to appear in the halftone.

Any quantizer may be used to perform the quantization. For example, a simple quantizer may be used which performs threshold on each coefficient and outputs one value or another based on whether the coefficient is above or below a threshold respectively. For instance, the quantizer may be as follows for each coefficient $x_{input}$ if $x_{input} < 0.5$, then $x_{output} = 0$;

otherwise, $x_{output} = 1$.

Such a quantizer is particularly useful for bilevel outputs (like Black-White halftoning). In another embodiment, a multi-level quantizer may be used, such as, for example, the following, where $y_i \in (y_1, y_2 \ldots y_L)$, the multiple levels of the quantizer.

$x_{output} = y_i$ that minimizes $(y_i - x_{input})^2$.

For more information on this quantizer, see A. Gersho & R. Gray, Vector Quantization and Signal Processing, Academic Publishers 1992, Massachusetts.

The errors produced as a result of quantization are passed onto neighboring coefficients. In one embodiment, the errors are passed according to the following table:

|  | X | 7/16 |
|---|---|---|
| 3/16 | 5/16 | 1/16 |

That is, the error incurred from coefficient X is diffused forward onto unprocessed coefficients on the right and below according to the weights given above.

Figure 11:
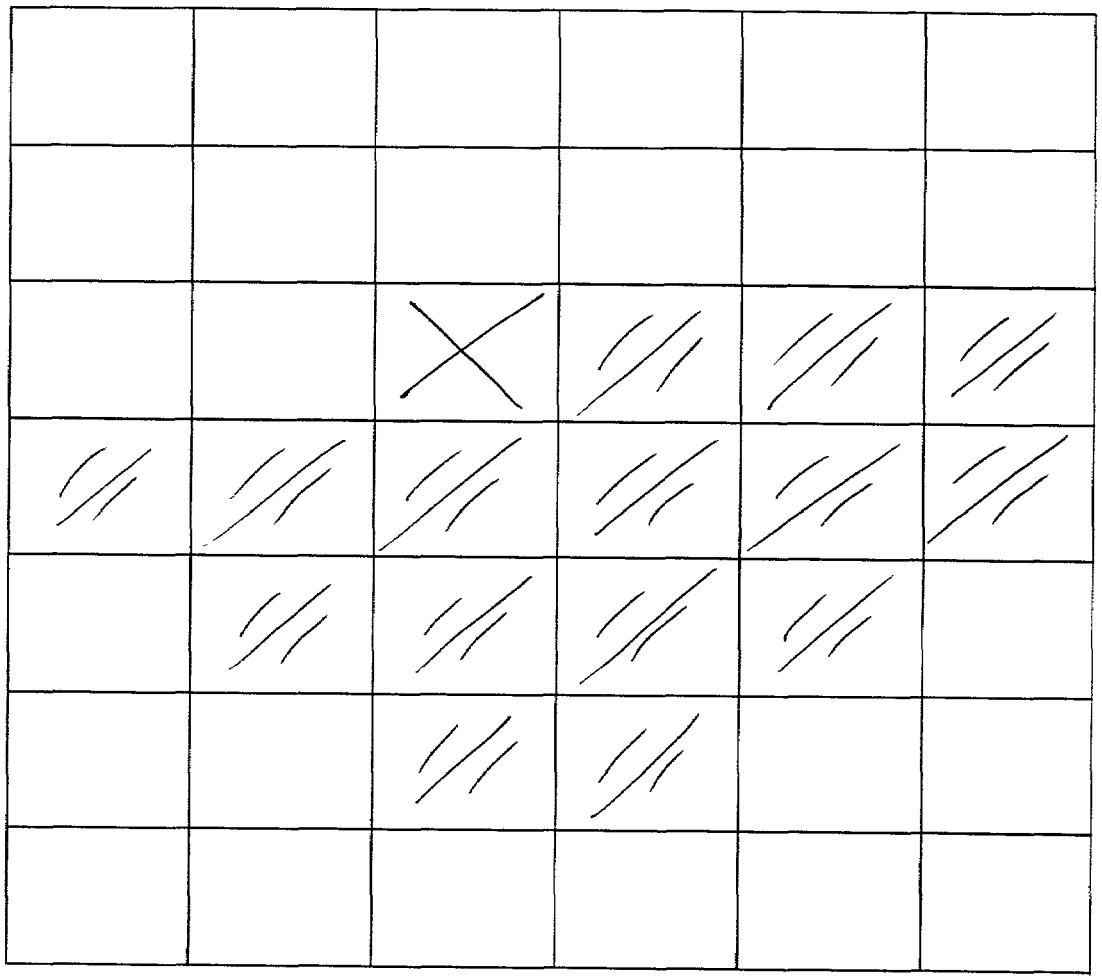
FIG. 11 illustrates one embodiment of a wavelet coefficient with an indication of wavelet coefficients that are spatially close.

In another embodiment, the spatially close multiresolutional coefficients to which the error is passed may be adjacent coefficients, spatially nearby coefficients, or coefficients away from the coefficient being quantized. FIG. 11 illustrates one example of a wavelet coefficient X which represents the coefficient that has just been quantized and other coefficients that are to be considered spatially close indicated with cross-hatching. Thus, the error may be passed to adjacent coefficients in the same or neighboring rows as well as coefficients in nearby rows of which the coefficients themselves are not neighboring coefficients nor are they in neighboring rows.

Thus, in general, let $e_{ij}$, an error produced at some (i,j) spatial location, be $$e_{ij} = x_{ij} - \hat{x}_{ij}$$

where $x_{ij}$ equals the original multiresolutional coefficient and $\hat{x}_{ij}$ equals a quantized version of x.

In one embodiment, the error filtering operation then changes the coefficients to include the error:

$$x_{i,j+1} = x_{i,j+1} + \frac{11}{27} e_{ij}$$

$$x_{i,j+2} = x_{i,j+2} + \frac{1}{27} e_{ij}$$

$$x_{i+1,j} = x_{i+1,j} + \frac{11}{27} e_{ij}$$

$$x_{i+1,j+1} = x_{i+1,j+1} + \frac{3}{27} e_{ij}$$

$$x_{i+2,j} = x_{i+2,j} + \frac{1}{27} e_{ij}$$

Note that some errors may be positive, some negative, and some transform coefficient may be negative.

Finally, in processing block 104, processing logic produces a resulting quantized image as an output. By performing error diffusion in the wavelet domain, an output similar to error diffusion in the pixel domain is created, but it is theoretically different, and in practice the results are also different. Theoretically, a key difference is that in the process of error diffusion, when a pixel is quantized it contains information only about the pixels that came before it (because it has received the errors of these predecessors). However, when error diffusion is performed in the wavelet domain, each coefficient already represents information about the pixels around it, including pixels that have not yet been quantized. A main advantage of this approach is the reduced processing time required to produce an output due to the removal of the need to return to the pixel domain before performing error diffusion.

Figure 7B:
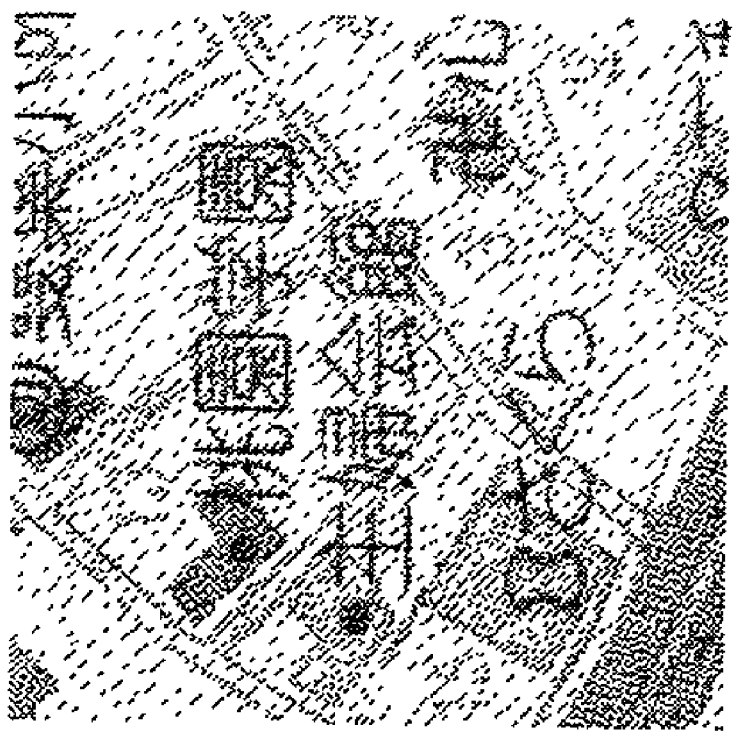
FIGS. 7A and 7B are diagrams comparing an example of the output of an error diffusion filter applied to the pixel domain with an example of the output of an error diffusion filter applied to the wavelet domain.
Figure 7A:
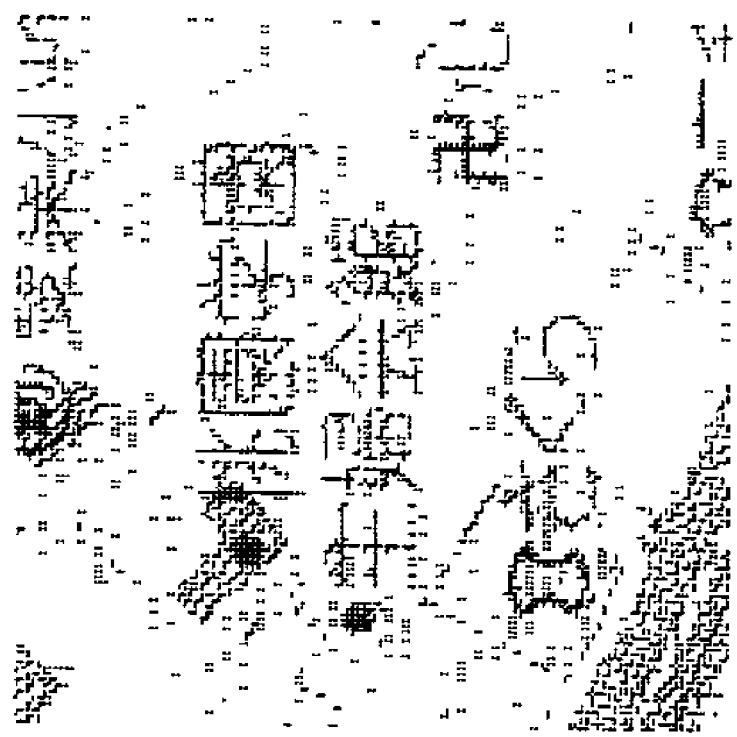
Figure 8:
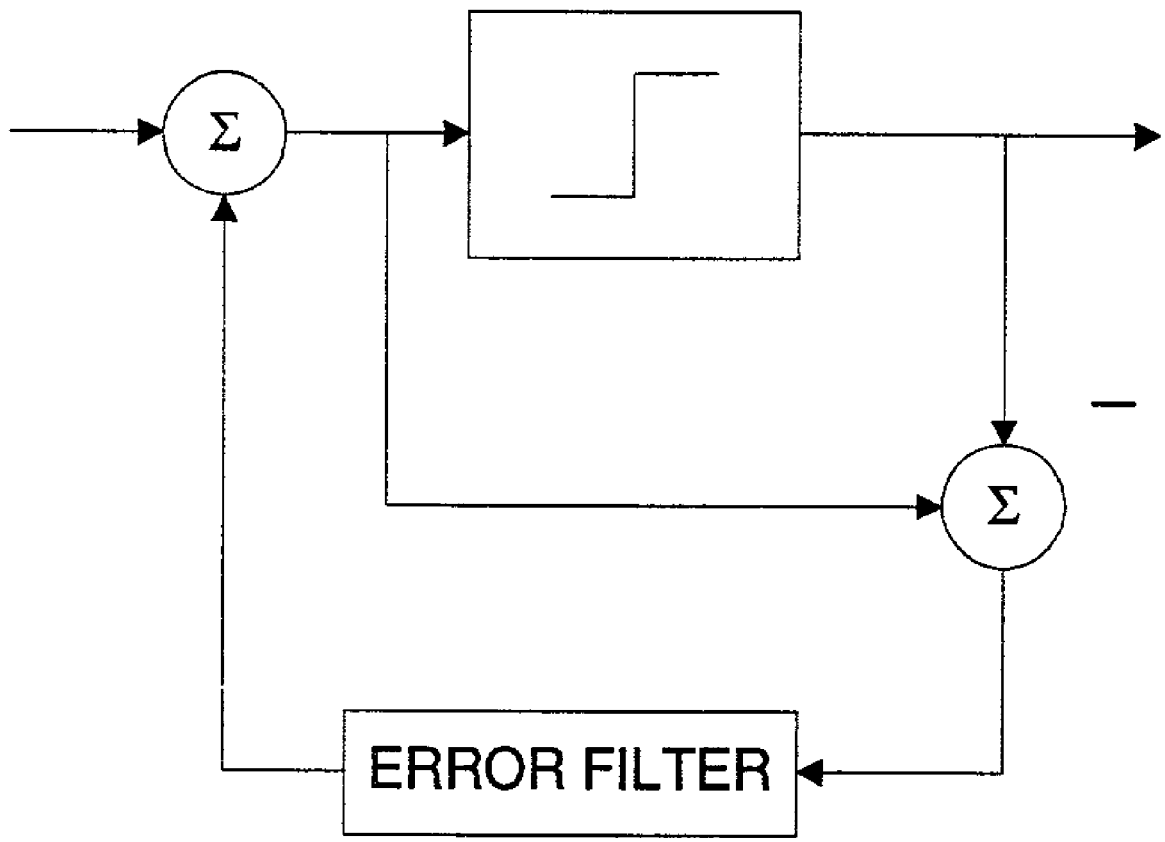
FIG. 8 is a block diagram showing a visual representation of error diffusion.

FIGS. 7A and 7B provide an example the output of an error diffusion filter applied to the pixel domain with an example of the output of an error diffusion filter applied to the wavelet domain. Image 701 is the output of an error diffusion filter applied to a pixel domain. Image 702 is the output of the same error diffusion filter applied to a wavelet domain; in this example, a Haar wavelet domain. It is shown that the same filter creates different outputs depending on whether the filter is applied to the wavelet or pixel domain. "Wormies," artifacts that look like worms in smooth regions, are different in the outputs. Furthermore, there is less hemming (i.e., false white surrounding dark text) in the Haar domain image 702. This makes the Haar domain image 702 look less jarring than the pixel domain image 701. Performing the error diffusion on the space-frequency (time-frequency) representation may provide similar image quality and other advantages, such as reduced computation time and faster output, and smoother background regions.

Figure 2:
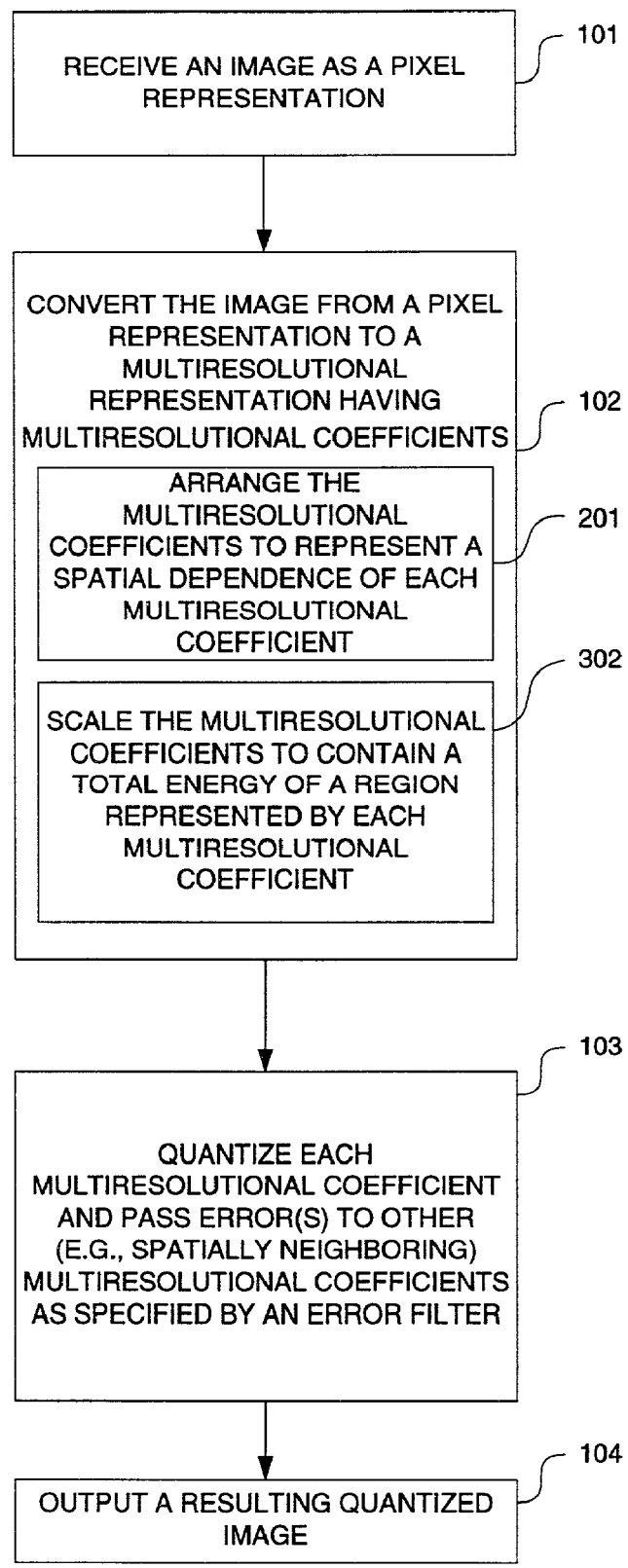
FIG. 2 is a flow diagram of one embodiment of a process for performing error diffusion that includes arranging the multiresolutional coefficients to represent a spatial dependence of each multiresolutional coefficient for error diffusion of a multiresolutional representation of an image and scaling the multiresolutional coefficients to contain a total energy of a region represented by each multiresolutional coefficient for error diffusion of a multiresolutional representation of an image.

FIG. 2 is a flow diagram of one embodiment of a process for performing error diffusion that includes arranging the multiresolutional coefficients to represent a spatial dependence of each multiresolutional coefficient for error diffusion of a multiresolutional representation of an image. In this embodiment, converting the image from a pixel representation to a multiresolutional representation having multiresolutional coefficients, shown in process block 102, includes arranging the multiresolutional coefficients to represent a spatial dependence of each multiresolutional coefficient, shown in included process block 201.

FIG. 9A illustrates an arrangement of first-level Haar coefficients for a one-level Haar wavelet transform.

FIG. 9B illustrates an arrangement of two-level Haar coefficients for a two-level Haar wavelet transform.

Note that arranging the pixels allows the image to look correct, and not appear disjointed and distorted. The arrangement is performed to get the transform coefficient "close" to the spatial area about which it has information about, otherwise, your image would come out disjointed and distorted.

Creating a halftone as described herein is different than error diffusion on the pixel domain. The same effect cannot be captured by error diffusing on the pixel domain. One difference is the causality, or how the information is being propagated. Error diffusion on the pixel domain only propagates information forward (in space); that is, it is a causal algorithm. The above embodiment first transforms the image from a pixel domain to a multiresolutional domain, which means that some coefficients now contain information about pixels in the future (spatially). For instance, a LL coefficient from a one level Haar transform, as shown in FIG. 9, contains information about pixels in the region corresponding to the LL coefficient. Thus, future information about the pixels is accessed when it quantizes that LL coefficient. Thus, the technique described herein is non-causal with respect to the pixel domain. It follows that no error diffusion done directly on the pixel domain could create the same result due to the causal nature of such direct error diffusion.

Viewed in light of causality, the above embodiment can be correctly said to preprocess the pixel image (i.e., by taking local averages and differences) and then error diffuse it.

Referring back to FIG. 2, the process of converting the image from a pixel representation to a multiresolutional representation having multiresolutional coefficients, shown in process block 102, includes scaling the multiresolutional coefficients to contain the total energy of a region represented by each multiresolutional coefficient, shown in included process block 202. The scaling may be done to ensure that smooth regions don't end up having the wrong average color. Such scaling may be performed as described in U.S. patent application Ser. No. 09/467,544, entitled "Multiscale Sharpening And Smoothing With Wavelets", filed Dec. 10, 1999, which is incorporated herein by reference and assigned to the corporate assignee of the present invention. One could choose to scale the difference coefficients by more, and this provides extra sharpening.

Figure 10B:
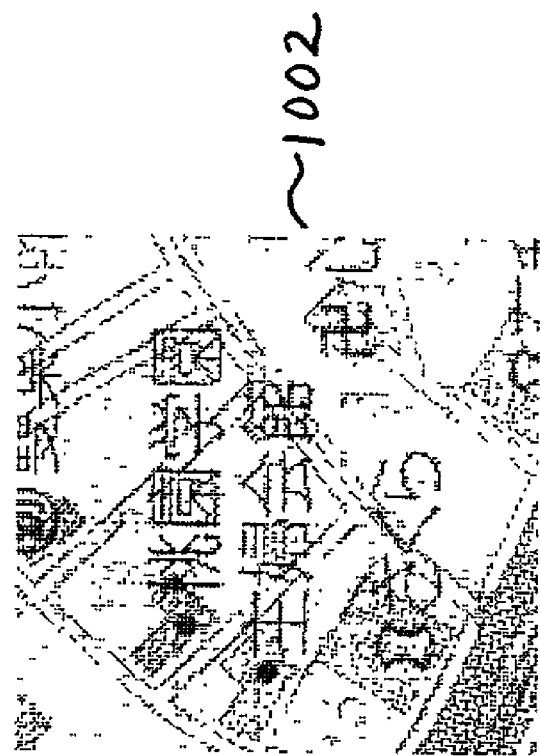
FIGS. 10A and 10B illustrate an example of sealing the difference coefficients additionally to provide extra sharpening.
Figure 10A:
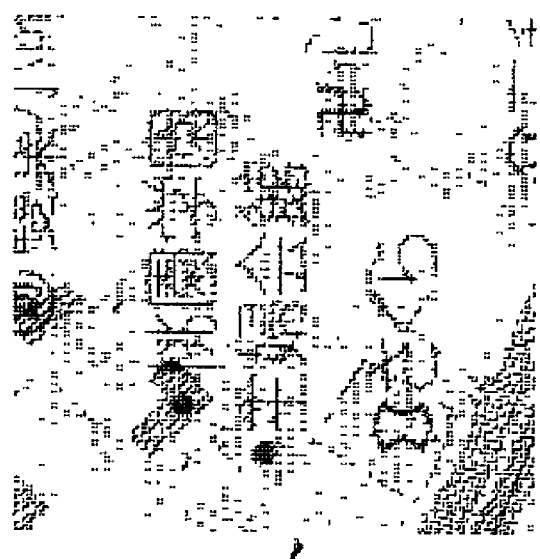

FIGS. 10A and 10B illustrate an example of scaling the difference coefficients additionally to provide extra sharpening. Referring to FIG. 10A, image 1001 is the result of performing wavelet error diffusion as described above without scaling. Image 1002 in FIG. 10B illustrates the result of performing wavelet error diffusion with wavelet difference coefficients scaled up by 3.

Thus, a halftone is created from a multiresolutional representation of the image using error propagation and without inverting the multiresolutional transform. The result is that the output quantized image may be a good halftone of the original pixel image. An intuitive way to understand the process is by viewing the multiresolutional representation as a downsampled image (i.e., the lowest resolution) with errors (i.e., the difference or wavelet coefficients). Each coefficient is quantized, and then passes the coefficient's influence (error) on, so that the lowpass coefficients influence an entire region by dint of the error propagation. The difference coefficients attempt to locally correct that influence to ensure the original image's edges are visible in the halftone, and if the correction is not complete, then there will be an error that is passed on to correct it nearby.

Figure 3:
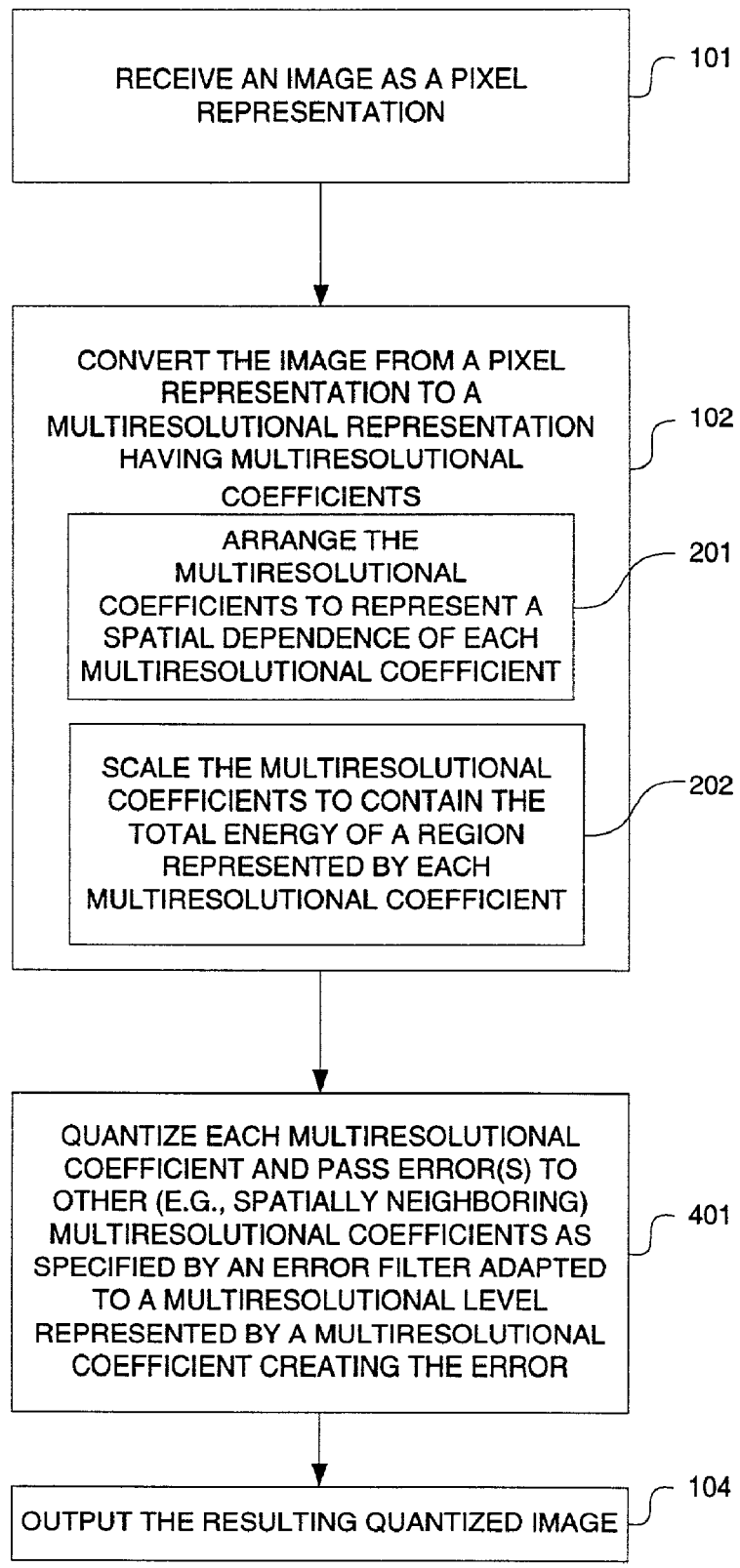
FIG. 3 is a flow diagram of one embodiment of a process for performing error diffusion of a multiresolutional representation of an image in which an error filter is adapted to a multiresolutional level represented by a multiresolutional coefficient creating the error.

In one embodiment, a one level Haar transform is used to create the multiresolutional representation and binary quantization is subsequently applied thereto. This results in the generation of an output that is a good halftone of the original pixel image. In alternative embodiments, the number of multiresolutional levels increases. As the number of multiresolutional levels increases, more artifacts may be introduced due to the multiresolutional representation, and a more distorted looking halftone may result. One possible solution is to use multi-level error filters and vary the error spatial filter depending on what multiresolutional level is represented by the coefficient that created the error. FIG. 3 is a flow diagram of one embodiment of a process for performing error diffusion of a multiresolutional representation of an image in which an error filter is adapted to a multiresolutional level represented by a multiresolutional coefficient creating the error. In this embodiment, each multiresolutional coefficient is quantized and an error value (s) is passed to spatially neighboring multiresolutional coefficients as specified by an error filter adapted to a multiresolutional level represented by a multiresolutional coefficient creating the error, shown in process block 401.

The actual filter design used (e.g., in an image duplication device such as a copier) may, but need not, depend on the characteristics of the image duplication device, on some pre-filtering, or on the needs of an audience (e.g., sharper text or smoother background may be required). A desired filter can be designed for the wavelet coefficients. The performance of a filter may, however, depend on the dots per inch, the device characteristics (including dot gain and isolated dot performance), and/or the intended purpose (e.g., text photocopying, image reproduction, etc.)

One of the keys to filter design for a filter to be used in the present invention is its extent. A filter that has a large spatial extent (and correspondingly small filter taps) will create sharper looking images because if there is an edge it is sure to express itself without being buried by the error of its immediate neighbor. However, this sharpness may also manifest itself as white or black shadow, or hemming. This white shadow that surrounds gray or black text both creates an artificial look and is a transient effect, but is also visually responsible for the appearance of enhanced sharpness. This effect of spatially larger filters holds true when doing error diffusion on wavelet coefficients.

However, larger spatial filters tend to also create a 'messier' or more random looking image. This effect is true for both pixel and wavelet domains, and in certain cases it counteracts the sharpening effect because thin lines may get "lost" in the messiness of a gray background that is not smoothly reproduced. An adaptive choice of filters can be made, for instance, large filters can be used in dark or bright region and small filters can be used in mid-tone regions. Extending the filter to the left of the pixel being quantized tends to result in less worm artifacts.

Spatial filtering may also be accomplished, according to one embodiment, by passing on the error differently to neighboring coefficients of different multiresolutional levels. The taps of the spatial filter might then differ depending on the level. This is the same idea as above in FIG. 3. For instance, each error might only be passed to close neighbors of the same multiresolutional level as the error-producer.

Figure 4:
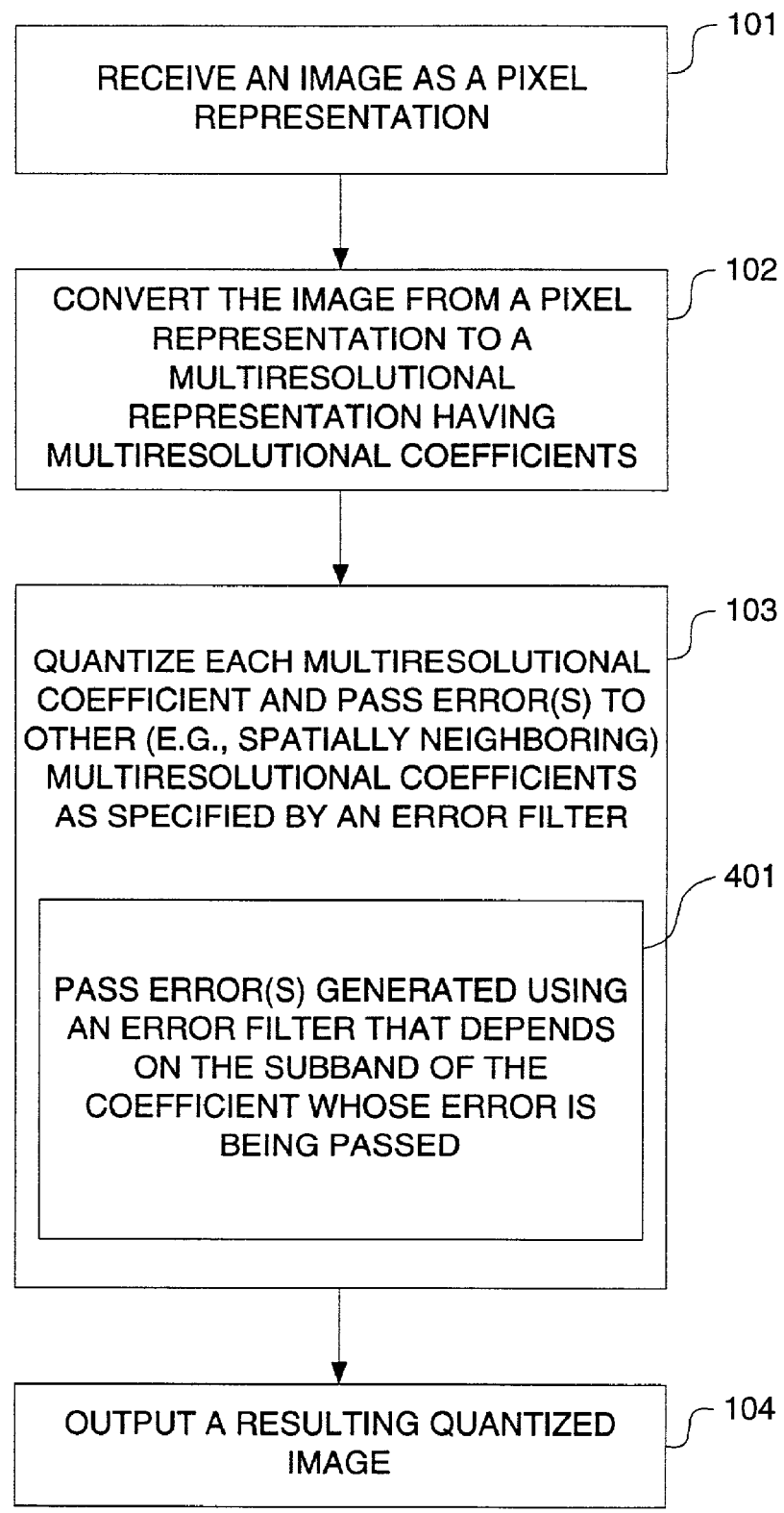
FIG. 4 is a flow diagram of one embodiment of a process for performing error diffusion that includes passing the error generated using an error filter that depends on the subband of the coefficient whose error is being passed.
Figure 5:
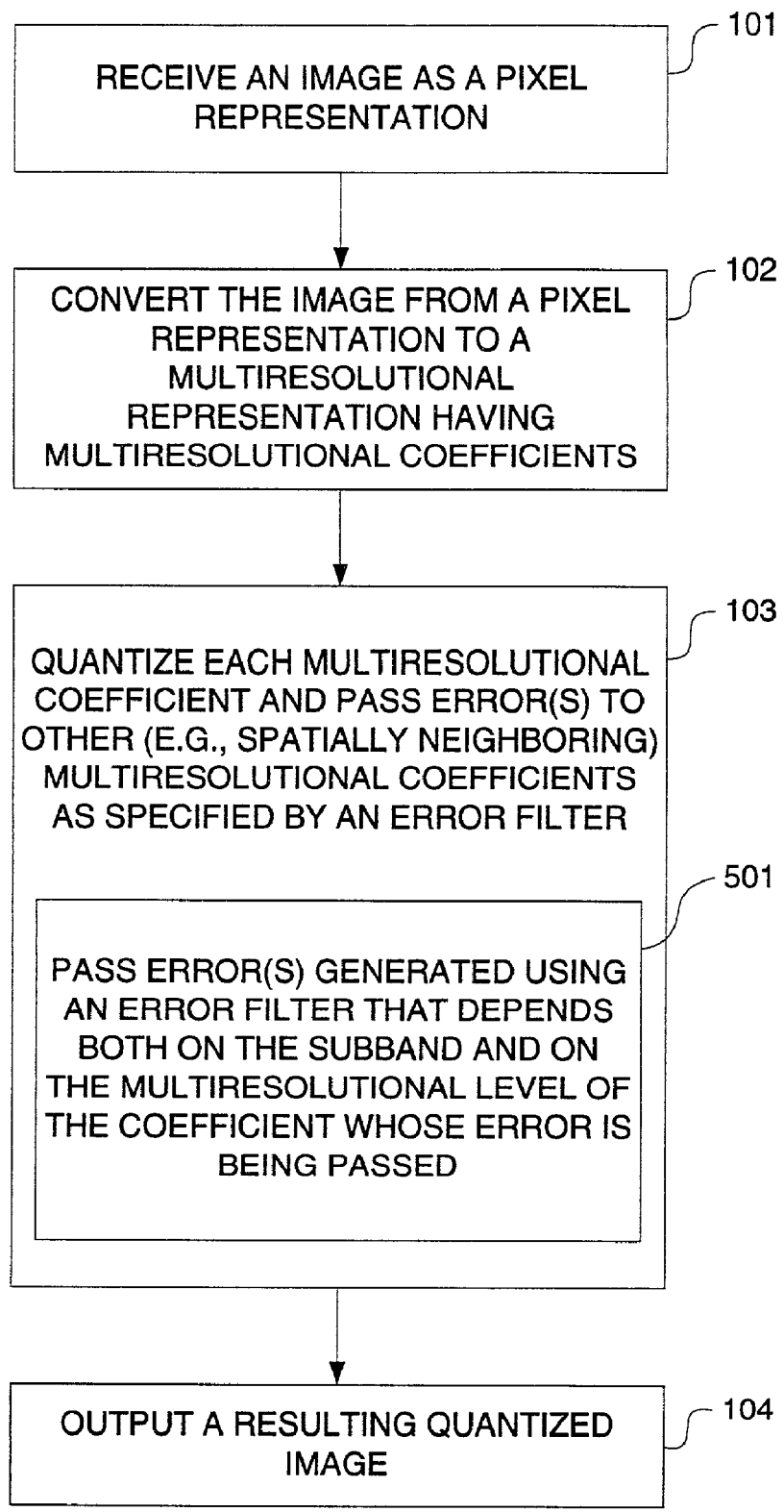
FIG. 5 is a flow diagram of one embodiment of a process for performing error diffusion that includes passing the error generated using an error filter that depends both on the subband and on the multiresolutional level of the coefficient whose error is being passed.

FIG. 4 is a flow diagram of one embodiment of a process for performing error diffusion that includes passing the error generated using an error filter that depends on the subband of the coefficient whose error is being passed. FIG. 5 is a flow diagram of one embodiment of a process for performing error diffusion that includes passing the error generated using an error filter that depends both on the subband and on the multiresolutional level of the coefficient whose error is being passed.

According to one embodiment, if the multiresolutional transform was overcomplete (e.g., taking N×N pixels to more than N×N transform coefficients) then the resulting halftone image would naturally include some interpolation (as each transform coefficient would result in a halftone coefficient). However, another way to handle this, according to an alternative embodiment, would be to only record uniformly sampled N×N of the halftone coefficients, that is, error diffuse over all the transform coefficients but only record a uniform sampling of N×N of the halftone coefficients (this is equivalent to downsampling the error diffused overcomplete representation).

When two close frequencies are superimposed, an unwanted lower frequency "beat" may result. This effect is called "moiré." This has been called "the most noticeable spatial domain problem in color printing." If the original image has a periodic structure (for example, if it has a regular cluster dot dither halftone structure already in it) then error diffusion may lead to some moiré. However, when error diffusion is performed on the wavelet domain, there may be a regular periodic structure to the arrangement of the wavelet coefficients, and this greater periodicity may increase the risk of moiré. Non-regular arrangements of the transform coefficients should reduce the risk of moiré.

Figure 6A:
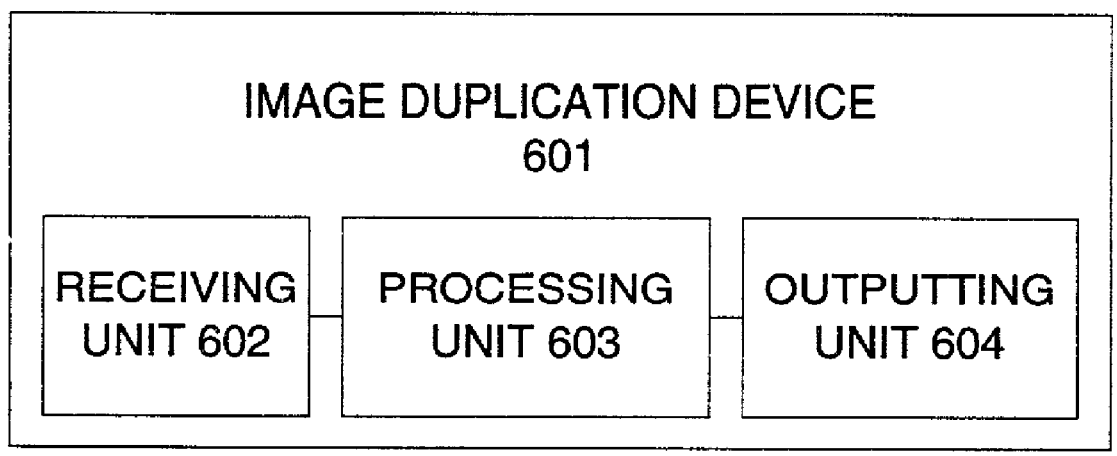
FIGS. 6A and 6B are block diagrams of embodiments of a device to perform error diffusion of a multiresolutional representation of an image.

FIG. 6A is a block diagram of one embodiment of an image processing device to perform error diffusion of a multiresolutional representation of an image. In one embodiment, the image processing device 601 is part of a printer. In an alternative embodiment, the image processing device 601 is part of a copier. Image processing device 601 comprises a receiving unit 602 to receive an image as a pixel representation. Image processing device 601 also comprises a processing unit 603 coupled with the receiving unit 601. Processing unit 602 converts the image from a pixel representation to a multiresolutional representation having multiresolutional coefficients. Processing unit 602 also quantizes each multiresolutional coefficient and passes error values in each iteration to spatially neighboring multiresolutional coefficients as specified by an error filter. Image processing device 601 further comprises an outputting unit 604 coupled with processing unit 603. Outputting unit 604 outputs a resulting quantized image.

Figure 6B:
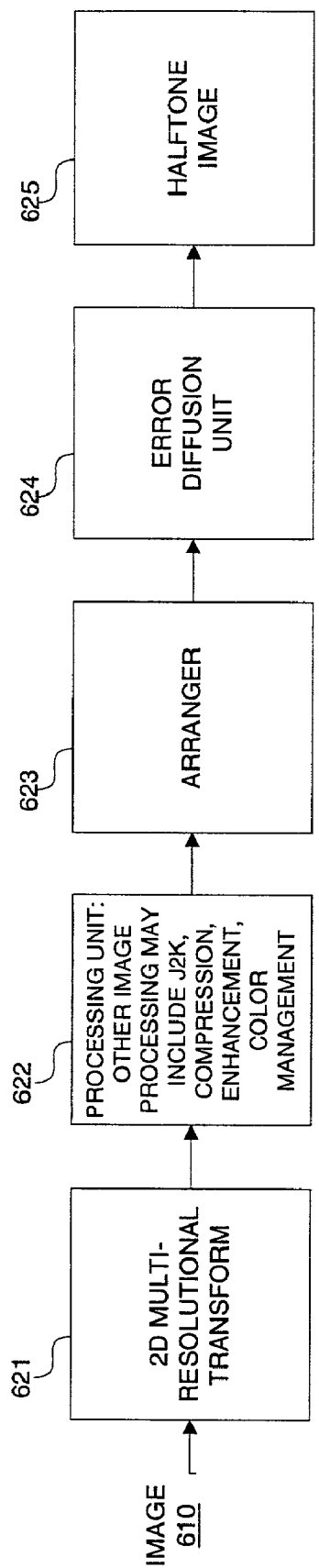

FIG. 6B is an alternative embodiment of an image processing device to perform error diffusion on a multiresolutional representation of an image. Referring to FIG. 6B, image 610 is received by two-dimensional (2D) multiresolution transform 621. The 2D multiresolutional transform 621 converts image 610 to wavelet transform coefficients. The coefficients are output to an optional processing unit 622. Processing 622 is optional and may perform other image processing such as, for example, but not limited to, JPEG 2000 compression or other compression, enhancement, and/or color management. These operations are performed on the coefficients.

Arranger 623 arranges the multiresolutional coefficients as described above to represent a spatial dependence of each multiresolutional coefficient. Error diffusion unit 624 receives the output from arranger 623 and performs the error diffusion described above on the arranged coefficients to produce a halftone image 625.

The method and apparatus disclosed herein may be integrated into advanced Internet- or network-based knowledge systems as related to information retrieval, information extraction, and question and answer systems. The system has a processor coupled to a bus. Also shown coupled to the bus is a memory which may contain instructions. Additional components coupled to the bus are a storage device (such as a hard drive, floppy drive, CD-ROM, DVD-ROM, etc.), an input device (such as a keyboard, mouse, light pen, bar code reader, scanner, microphone, joystick, etc.), and an output device (such as a printer, monitor, speakers, etc.). Of course, an exemplary computer system could have more components than these or a subset of the components listed.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. Beyond the immediate practical possibilities for this technique, the idea of sigma-delta modulation on the wavelet domain is an interesting proposition which opens up new interpretations and may impact the general oversampled analog to digital conversion problem and audio applications.

What is claimed is:

1. A method comprising:
   receiving a multi-resolutional representation of an original pixel image; and
   performing halftoning on the multi-resolutional representation in the wavelet domain to produce an output operational image, including quantizing multiresolutional coefficients, and
passing one or more error values onto one or more other multiresolutional coefficients.

2. The method defined in claim 1 wherein the multiresolutional representation comprises a pyramidal decomposition of the image.

3. The method defined in claim 1 wherein the multiresolutional representation comprises a two dimensional (2D) wavelet decomposition of the image.

4. The method defined in claim 1 wherein the multiresolutional representation comprises a time-frequency decomposition of the image.

5. The method defined in claim 1 further comprising converting the original pixel image into the multiresolutional representation of the image.

6. The method defined in claim 1 further comprising scaling coefficients so coefficients contain the total energy of the region they represent.

7. The method defined in claim 1 further comprising performing increased scaling of difference coefficients for enhanced edges in the halftone.

8. The method defined in claim 1 further comprising applying an error filter to the multiresolutional coefficients, including changing the error filter depending on the multiresolution level of an error-producing coefficient.

9. The method defined in claim 1 further comprising applying an error filter to the multiresolutional coefficients, and wherein the error filter is different or adaptive depending on the directional subband represented by the error-producing coefficient.

10. The method defined in claim 1 further comprising applying an error filter to the multiresolutional coefficients, and wherein the error filter is adaptive based on both the multiresolution level of the error-producing coefficient and the directional subband represented by the error-producing coefficient.

11. The method defined in claim 1, wherein receiving the multiresolutional representation of the original pixel image includes arranging the multiresolutional coefficients to represent a spatial dependence of each multiresolutional coefficient.

12. An apparatus comprising:
means for receiving a multi-resolutional representation of an original pixel image; and
means for performing halftoning on the multi-resolutional representation in the wavelet domain to produce an output operational image, including
means for quantizing multiresolutional coefficients, and
means for passing one or more error values onto one or more other multiresolutional coefficients.

13. The apparatus defined in claim 12 wherein the multiresolutional representation comprises a pyramidal decomposition of the image.

14. The apparatus defined in claim 12 wherein the multiresolutional representation comprises a two dimensional (2D) wavelet decomposition of the image.

15. The apparatus defined in claim 12 wherein the multiresolutional representation comprises a time-frequency decomposition of the image.

16. The apparatus defined in claim 12 further comprising means for converting the original pixel image into the multiresolutional representation of the image.

17. The apparatus defined in claim 12 further comprising means for scaling coefficients so coefficients contain the total energy of the region they represent.

18. The apparatus defined in claim 12 further comprising means for performing increased scaling of difference coefficients for enhanced edges in the halftone.

19. The apparatus defined in claim 12 further comprising means for applying an error filter to the multiresolutional coefficients, including means for changing the error filter depending on the multiresolution level of an error-producing coefficient.

20. The apparatus defined in claim 12 further comprising means for applying an error filter to the multiresolutional coefficients, and wherein the error filter is different or adaptive depending on the directional subband represented by the error-producing coefficient.

21. The apparatus defined in claim 12 further comprising means for applying an error filter to the multiresolutional coefficients, and wherein the error filter is adaptive based on both the multiresolution level of the error-producing coefficient and the directional subband represented by the error-producing coefficient.

22. The apparatus defined in claim 12, wherein the means for receiving the multiresolutional representation of the original pixel image includes means for arranging the multiresolutional coefficients to represent a spatial dependence of each multiresolutional coefficient.

23. An article of manufacture comprising a computer-readable medium encoded with a computer program which, when executed by a machine, causes the machine to:
receive a multi-resolutional representation of an original pixel image; and
perform halftoning on the multi-resolutional representation in the wavelet domain to produce an output operational image by
quantizing multiresolutional coefficients, and
passing one or more error values onto one or more other multiresolutional coefficients.

24. The article of manufacture defined in claim 23 further comprising instructions which, when executed by the machine, cause the machine to convert the original pixel image into the multiresolutional representation of the image.

25. The article of manufacture defined in claim 23 further comprising instructions which, when executed by the machine, cause the machine to scale coefficients so coefficients contain the total energy of the region they represent.

26. The article of manufacture defined in claim 23 further comprising instructions which, when executed by the machine, cause the machine to perform increased scaling of difference coefficients for enhanced edges in the halftone.

27. The article of manufacture defined in claim 23 further comprising instructions which, when executed by the machine, cause the machine to apply an error filter to the multiresolutional coefficients, including change the error filter depending on the multiresolution level of an error-producing coefficient.

28. An apparatus comprising:
a transform;
an arranger coupled to the transform; and
an error diffusion unit coupled to the arranger to perform halftoning on a multi-resolutional representation in the wavelet domain to produce an output operational image, wherein the error diffusion unit includes
a quantizer to quantize multiresolutional coefficients, and
an error filter to pass one or more error values onto one or more other multiresolutional coefficients.

29. The apparatus defined in claim 28 wherein the error filter is changed depending on the multiresolutional level of an error-producing coefficient.

30. The apparatus defined in claim 28 wherein the error filter is changed depending on the directional subband represented by the error-producing coefficient.

31. The apparatus of claim 28, further comprising a processing unit to convert an image from a pixel representation to the multiresolutional representation having multiresolutional coefficients and to arrange the multiresolutional coefficients to represent a spatial dependence of each multiresolutional coefficient.

32. The apparatus of claim 31, wherein the processing unit, in order to convert the image from the pixel representation to the multiresolutional representation having multiresolutional coefficients scales the multiresolutional coefficients to contain a total energy of a region represented by each multiresolutional coefficient.

33. The apparatus of claim 28, wherein the error filter is adapted to a multiresolutional level represented by a multiresolutional coefficient creating the error.

34. The apparatus of claim 28, wherein the error diffusion unit is operable to iteratively quantize each multiresolutional coefficient and pass an error to spatially neighboring multiresolutional coefficients of a same scale as specified by the error filter.

35. An article of manufacture comprising a computer-readable medium encoded with a computer program which, when executed by a machine, cause the machine to:
receive a multi-resolutional representation of an original pixel image; and
perform halftoning on the multi-resolutional representation in the wavelet domain to produce an output operational image, by
quantizing multiresolutional coefficients, and
passing one or more error values onto one or more other multiresolutional coefficients.

36. The article of manufacture of claim 35, further comprising instructions which, when executed by the machine, cause the machine to convert the image from a pixel representation to a multiresolutional representation having multiresolutional coefficients, where converting the image includes arranging the multiresolutional coefficients to represent a spatial dependence of each multiresolutional coefficient.

37. The article of manufacture of claim 35, further comprising instructions which, when executed by the machine, cause the machine to convert the image from a pixel representation to a multiresolutional representation having multiresolutional coefficients, where converting the image includes scaling the multiresolutional coefficients to contain a total energy of a region represented by each multiresolutional coefficient.

38. The article of manufacture of claim 35, wherein the error filter is adapted to a multiresolutional level represented by a multiresolutional coefficient creating the error.

39. The article of manufacture of claim 35, further comprising instructions which, when executed by the machine, cause the machine to iteratively quantize each multiresolutional coefficient and pass an error to spatially neighboring multiresolutional coefficients as specified by an error filter, where passing the error includes passing the error to neighboring multiresolutional coefficients of a same scale.

* * * * *